(12) United States Patent
Yu et al.

(10) Patent No.: US 11,924,606 B2
(45) Date of Patent: Mar. 5, 2024

(54) SYSTEMS AND METHODS FOR DETERMINING THE INCIDENT ANGLE OF AN ACOUSTIC WAVE

(71) Applicant: Toyota Motor Engineering & Manufacturing North America, Inc., Plano, TX (US)

(72) Inventors: Ziqi Yu, Ann Arbor, MI (US); Xiaopeng Li, Ann Arbor, MI (US); Taehwa Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 252 days.

(21) Appl. No.: 17/557,934

(22) Filed: Dec. 21, 2021

(65) Prior Publication Data
US 2023/0199379 A1    Jun. 22, 2023

(51) Int. Cl.
*H04R 1/40* (2006.01)
*G10K 11/172* (2006.01)
*H04R 3/00* (2006.01)

(52) U.S. Cl.
CPC .......... *H04R 1/406* (2013.01); *G10K 11/172* (2013.01); *H04R 3/005* (2013.01); *H04S 2400/15* (2013.01)

(58) Field of Classification Search
CPC .... H04R 19/04; H04R 1/44; H04R 2201/401; H04R 1/406; H04R 2201/403; H04R 2430/20; H04R 2400/01; H04R 2201/405; H04R 2201/40; H04R 3/005; H04R 3/00; H04R 3/02; H04R 3/10; H04R 3/08; H04R 3/06; H04R 3/04; G01K 11/172; G10K 2210/32272; G10K 2210/3227; G10K 11/04; G10K 2210/32271; H01P 7/082; H01P 7/10; H01P 7/00
(Continued)

(56) References Cited

U.S. PATENT DOCUMENTS

| | | | |
|---|---|---|---|
| 6,618,485 B1 * | 9/2003 | Matsuo | H04R 3/005 381/26 |
| 6,757,394 B2 * | 6/2004 | Matsuo | H04R 3/005 381/91 |

(Continued)

OTHER PUBLICATIONS

R. Bullen and B. Lawrence, "Measured Performance of a Directional Noise Monitoring System," ICSV14, Cairns, Australia, Jul. 9-12, 2007.
(Continued)

*Primary Examiner* — Daniel L Murphy
*Assistant Examiner* — Amie M Ndure
(74) *Attorney, Agent, or Firm* — Christopher G. Darrow; Darrow Mustafa PC

(57) ABSTRACT

Systems and methods for determining the incident angle of an acoustic wave are presented herein. One embodiment receives an acoustic wave at N transducers, where N is a natural number greater than or equal to 2; solves a set of N coupled differential equations modeling a set of N virtual coupled acoustic resonators using N coupled analog circuits, wherein each of the N coupled analog circuits receives an output signal from a unique one of the N transducers and outputs a voltage signal; and analyzes the N voltage signals output by the N coupled analog circuits to produce an estimate of the incident angle of the acoustic wave.

20 Claims, 5 Drawing Sheets

(58) Field of Classification Search
USPC .......................................................... 367/129
See application file for complete search history.

(56) References Cited

U.S. PATENT DOCUMENTS

| | | | |
|---|---|---|---|
| 7,020,290 B1 | 3/2006 | Ribic | |
| 10,986,447 B2* | 4/2021 | Malsky | H04R 3/14 |
| 2003/0179890 A1* | 9/2003 | Matsuo | H04R 3/005 |
| | | | 381/91 |
| 2005/0150299 A1* | 7/2005 | Wu | G06F 30/23 |
| | | | 73/587 |
| 2009/0010449 A1* | 1/2009 | Burnett | H04R 3/005 |
| | | | 381/92 |
| 2011/0110531 A1* | 5/2011 | Klefenz | H04R 3/005 |
| | | | 381/92 |
| 2018/0166062 A1* | 6/2018 | Hoffberg | G10K 11/18 |
| 2020/0404420 A1* | 12/2020 | Malsky | H04R 1/24 |
| 2021/0127201 A1 | 4/2021 | Lee et al. | |

OTHER PUBLICATIONS

J. Lee et al., "Real-Time Sound Localization Using Time Difference for Human Robot Interaction," 2005.

S. Tiwary et al., "Analog Circuit for Sound Localization Applications," Carnegie Mellow University, 2002.

Y. Park et al., "Single-Channel Multiple-Receiver Sound Source Localization System with Homomorphic Deconvolution and Linear Regression," Sensors 2021.

D. Kuebler, "Signal Acquisition and Processing for Autonomous Space Shuttle Cargo Bay Acoustic Measurements," Thesis, U.S. Naval Postgraduate School, Monterey, California, Jun. 1988.

H. Kim et al., "Sound's Direction Detection and Speech Recognition System for Humanoid Active Audition," ICCAS2003.

* cited by examiner

SYSTEMS AND METHODS FOR DETERMINING THE INCIDENT ANGLE OF AN ACOUSTIC WAVE

TECHNICAL FIELD

The subject matter described herein relates to systems and devices that process signals derived from acoustic waves and, more specifically, to systems and methods for determining the incident angle of an acoustic wave.

BACKGROUND

In a variety of applications, including robotics, the need for sound localization (determining the location of a sound source) arises. One aspect of sound localization is determining the direction from which a sound originates. This can include determining the incident angle (also referred to as the "angle of incidence") of a received acoustic wave. Some conventional systems for estimating the acoustic incident angle measure the difference in sound time of arrival or the difference in phase among a plurality of spaced-apart transducers such as microphones. One drawback of this approach is that the transducers generally need to be spaced far enough from one another that it becomes difficult to achieve a compact design. Placing the receiving transducers within physical acoustic resonators can improve amplitude sensitivity and help to make the design more compact, but strong resonance can inversely disturb the sound to be sensed.

SUMMARY

Embodiments of a system for determining the incident angle of an acoustic wave are presented herein. In one embodiment, the system comprises N transducers that receive the acoustic wave, where N is a natural number greater than or equal to 2. The system also includes N coupled analog circuits that solve a set of N coupled differential equations modeling a set of N virtual coupled acoustic resonators. Each of the N coupled analog circuits receives an output signal from a unique one of the N transducers and outputs a voltage signal. The system also includes one or more processors and a memory communicably coupled to the one or more processors. The memory stores a plurality of program instructions that when executed by the one or more processors cause the one or more processors to output an estimate of the incident angle of the acoustic wave based on an analysis of the N voltage signals output by the N coupled analog circuits.

Another embodiment is a non-transitory computer-readable medium for determining an incident angle of an acoustic wave and storing instructions that when executed by one or more processors cause the one or more processors to analyze N voltage signals output by N coupled analog circuits that solve a set of N coupled differential equations modeling a set of N virtual coupled acoustic resonators to produce an estimate of the incident angle of the acoustic wave. N is a natural number greater than or equal to 2, each of the N coupled analog circuits receives an output signal from a unique one of N transducers that receive the acoustic wave, and each of the N coupled analog circuits outputs one of the N voltage signals.

Another embodiment is a method of determining an incident angle of an acoustic wave. The method includes receiving an acoustic wave at N transducers, where N is a natural number greater than or equal to 2. The method also includes solving a set of N coupled differential equations modeling a set of N virtual coupled acoustic resonators using N coupled analog circuits, wherein each of the N coupled analog circuits receives an output signal from a unique one of the N transducers and outputs a voltage signal. The method also includes analyzing the N voltage signals output by the N coupled analog circuits to produce an estimate of the incident angle of the acoustic wave.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Various embodiments of an incident-angle determination system described herein overcome the shortcomings of conventional systems, including the problem of strong resonance inversely disturbing the sound to be sensed, by simulating the effect of physical resonators using analog circuits. This approach removes any need for physical resonators, supporting a compact design while eliminating the potential for strong resonance.

In various embodiments, an incident-angle determination system includes N transducers that receive an acoustic wave, where N is a natural number greater than or equal to 2. In some embodiments, the N transducers are microphones. In other embodiments, a different type of transducer can be used. A set of N coupled differential equations (equations of motion) model a set of N virtual coupled acoustic resonators. Note that these virtual coupled acoustic resonators are not physical resonators. Rather, they are hypothetical resonators in a mathematical model. The incident-angle determination system simulates the effect of each of the N transducers being within a respective one of the N virtual coupled acoustic resonators. In some embodiments, the set of N virtual coupled acoustic resonators is a set of N virtual coupled Helmholtz resonators.

In various embodiments, an incident-angle determination system includes N coupled analog circuits that solve the set of N coupled differential equations mentioned above. Each of the N coupled analog circuits receives an electrical signal output by a unique one of the N transducers and outputs a voltage signal. A plurality of program instructions stored in a memory, when executed by one or more processors communicably coupled to the memory, cause the one or more processors to output an estimate of the incident angle of an acoustic wave based on an analysis of the N voltage signals output by the N coupled analog circuits. For example, in some embodiments, the system computes a corresponding power level for each of the N voltage signals. As explained in greater detail below, the incident angle of the acoustic wave can be estimated by computing ratios between pairs of power levels corresponding to the N transducers and comparing the power ratios to the known incident-angle characteristics of the N virtual coupled acoustic resonators.

In some embodiments, N is equal to 2, and the estimate of the incident angle of the acoustic wave lies between 0 and 180 degrees, inclusive. In other embodiments, N is equal to 3, and the estimate of the incident angle of the acoustic wave lies between 0 and 360 degrees, inclusive. In still other embodiments, N can be greater than 3.

Figure 1:
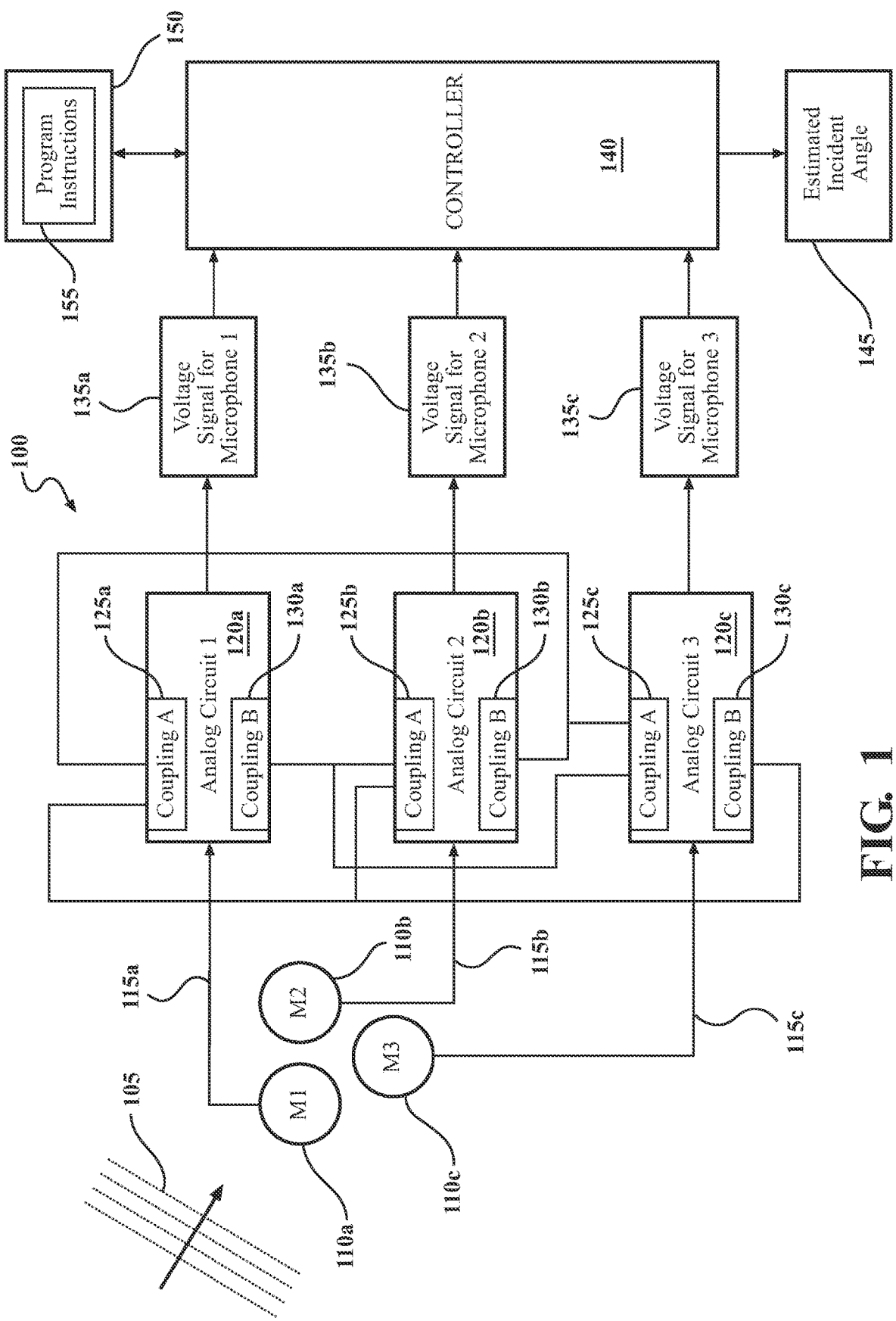
FIG. 1 is a block diagram of an incident-angle determination system, in accordance with an illustrative embodiment of the invention.

Referring to FIG. 1, it is a block diagram of an incident-angle determination system 100, in accordance with an illustrative embodiment of the invention. In the embodiment of FIG. 1, N is equal to 3, which supports the estimation of incident angles between 0 and 360 degrees, inclusive, as discussed above. In this embodiment, incident-angle determination system 100 includes three transducers, microphone 110a (Microphone 1), microphone 110b (Microphone 2), and microphone 110c (Microphone 3), which receive an acoustic wave 105. The respective outputs of the microphones 110a-c, outputs 115a-c, are input to analog circuit 120a (Analog Circuit 1), analog circuit 120b (Analog Circuit 2), and analog circuit 120c (Analog Circuit 3), respectively.

In this embodiment, analog circuit 120a includes a coupling A port 125a and a coupling B port 130a for electrical interconnection with the other two analog circuits, 120b and 120c. Similarly, analog circuit 120b includes a coupling A port 125b and a coupling B port 130b, and analog circuit 120c includes a coupling A port 125c and a coupling B port 130c. As shown in FIG. 1, in this embodiment, the coupling A port 125 of each of the three coupled analog circuits 120 is electrically connected with the coupling A port 125 and the coupling B port 130 of each of the other two coupled analog circuits 120. Stating this configuration more generally for the case of N transducers 110 and N coupled analog circuits 120, the first coupling port (coupling A port) of each of the N coupled analog circuits 120 is electrically connected with the first coupling port (coupling A port) and the second coupling port (coupling B port) of each of the other N−1 coupled analog circuits 120.

As discussed above, the N coupled analog circuits (recall that, in the embodiment of FIG. 1, N is equal to 3) solve a set of N coupled differential equations (equations of motion) that model a set of N virtual coupled acoustic resonators (e.g., virtual coupled Helmholtz resonators). Forces exerted on microphones 110a-c by the acoustic wave 105 can be measured. The analog circuits 120a-c convert the signals (115a-c) and output voltage signals (135a-c) similar to signals that would normally be output, if each microphone 110a, 110b, or 110c were located within an individual resonator. The virtual coupled acoustic resonators and their associated differential equations are discussed in further detail below.

As indicated in FIG. 1, analog circuit 120a outputs a voltage signal 135a corresponding to microphone 110a (Microphone 1), analog circuit 120b outputs a voltage signal 135b corresponding to microphone 110b (Microphone 2), and analog circuit 120c outputs a voltage signal 135c corresponding to microphone 110c (Microphone 3). The output voltage signals 135a-c are input to a controller 140 for processing and analysis. Controller 140 can be implemented in various ways, depending on the particular embodiment. In the embodiment of FIG. 1, controller 140 is implemented as one or more processors that are communicably coupled with a memory 150. The memory 150 stores a plurality of program instructions 155. The memory 150 is a random-access memory (RAM), read-only memory (ROM), a hard-disk drive, a flash memory, or other suitable memory for storing the plurality of program instructions 155. The plurality of program instructions 155 are, for example, computer-readable instructions that, when executed by the one or more processors, cause the one or more processors to perform the various functions disclosed herein. In other embodiments, the memory 150 and plurality of program instructions 155 may be integrated with a processor or microcontroller, or the functionality of controller 140 may be realized as an application-specific integrated circuit (ASIC) or other custom-hardware devices.

The plurality of program instructions 155, when executed by the one or more processors, cause the one or more processors (or whatever hardware device implements the functionality of controller 140) to output an estimated incident angle 145 of the acoustic wave 105 based on an analysis of the three voltage signals 135a-c output by the three coupled analog circuits 120a-c. The incident angle is measured with respect to a predetermined reference (not shown in FIG. 1). The angle reference can be defined in a manner that is convenient for a particular application. Generalizing, the plurality of program instructions 155, when executed by the one or more processors, cause the one or more processors (or whatever hardware device implements the functionality of controller 140) to output an estimated incident angle 145 of the acoustic wave 105 based on an analysis of the N voltage signals output by the N coupled analog circuits. Further details regarding the analysis of the voltage signals output by the coupled analog circuits to produce the estimated incident angle 145 are provided below in connection with FIG. 6.

Figure 2:
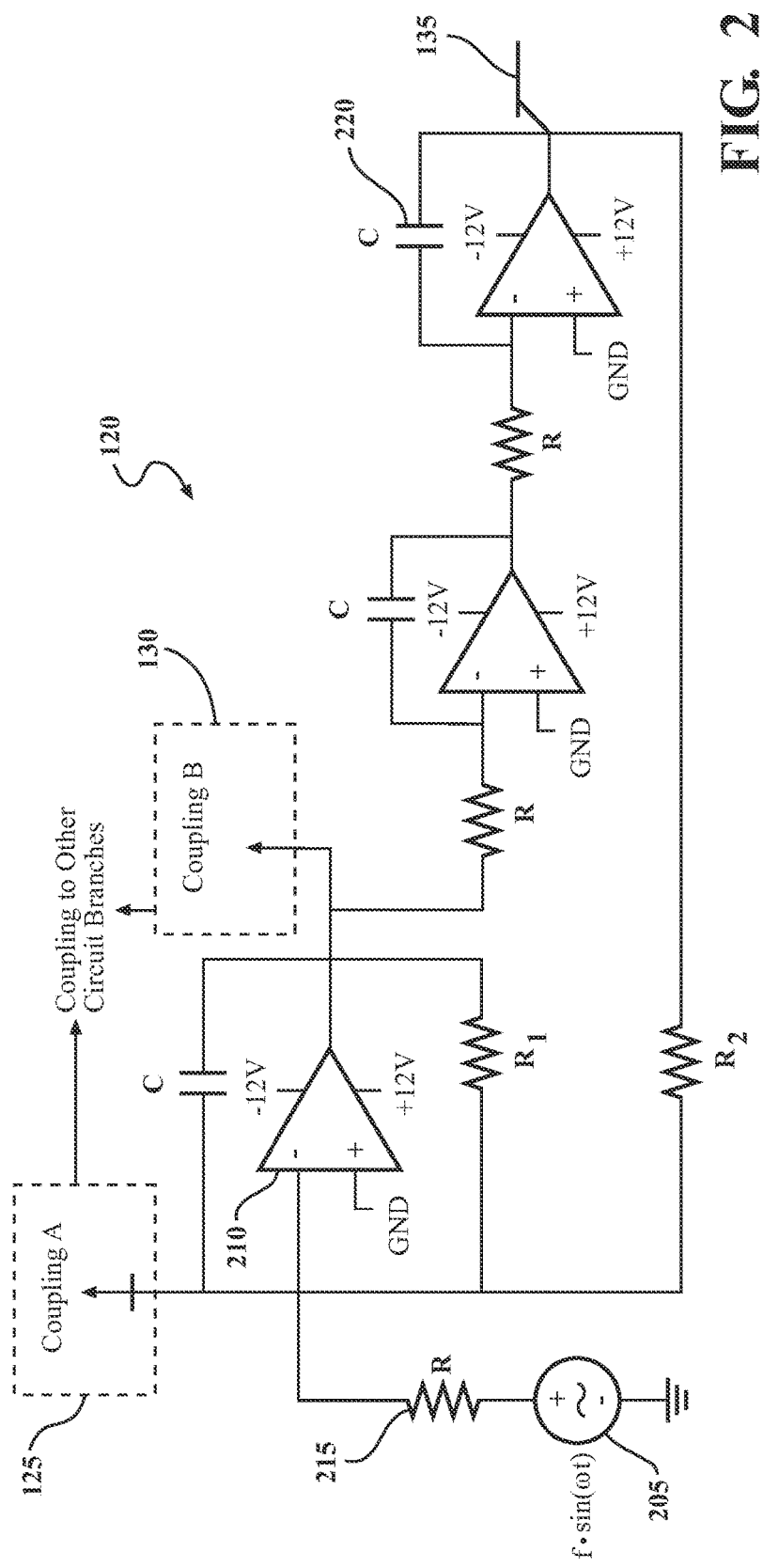
FIG. 2 is a schematic diagram of an analog circuit that can be used in an incident-angle determination system, in accordance with an illustrative embodiment of the invention.

FIG. 2 is a schematic diagram of an analog circuit 120 that can be used in an incident-angle determination system, in accordance with an illustrative embodiment of the invention. The circuit schematic in FIG. 2 can, for example, be an implementation of analog circuit 120a, analog circuit 120b, or analog circuit 120c, in the embodiment shown in FIG. 1. The circuit shown in FIG. 2 simulates one virtual acoustic resonator (e.g., a Helmholtz resonator). As shown in FIG. 2, analog circuit 120 includes AC input 205, three operational amplifiers 210, resistors 215 (R, $R_1$, and $R_2$), and capacitors 220 (C). As discussed above, analog circuit 120 includes a coupling A port 125 and a coupling B port 130 for electrical connection with like or similar analog circuits 120. As also discussed above, analog circuit 120 outputs a voltage signal 135. Output voltage signal 135 models the displacement, due to vibration, of the simulated virtual acoustic resonator. In a testing environment, AC input 205 (e.g., an AC power supply) mimics the acoustic force that would be output by a transducer (e.g., a microphone 110). This permits the response of incident-angle determination system 100 to be tested over a range of incident angles 105 and acoustic frequencies in a controlled manner. In an actual implementation, AC input 205 is replaced by one of the transducer outputs (e.g., 115*a-c*) just mentioned.

Figure 3:
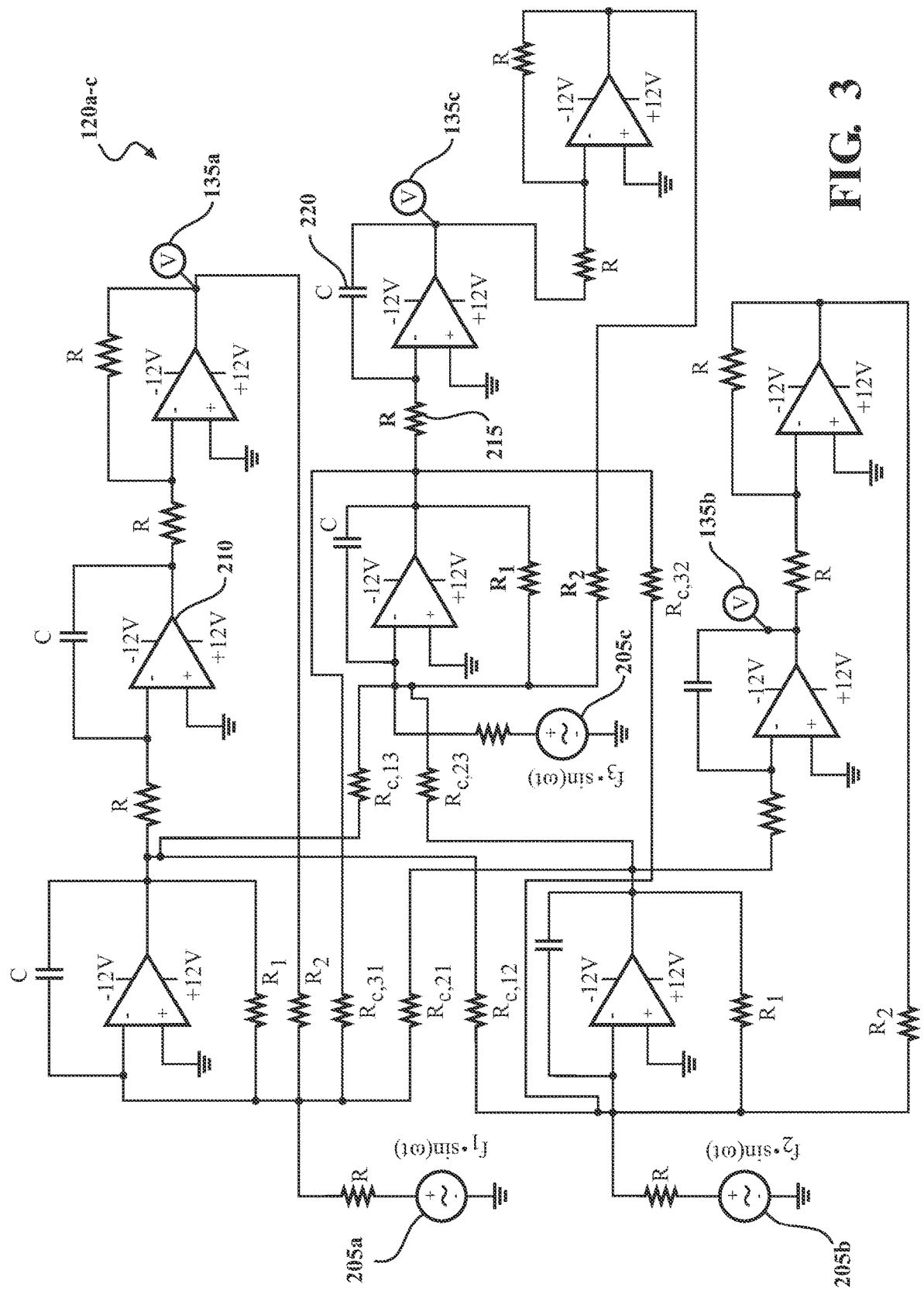
FIG. 3 is a schematic diagram of three coupled analog circuits forming part of an incident-angle determination system, in accordance with an illustrative embodiment of the invention.

FIG. 3 is a schematic diagram of three coupled analog circuits 120*a-c* forming part of incident-angle determination system 100, in accordance with an illustrative embodiment of the invention. FIG. 3 illustrates a complete schematic of the analog circuits 120*a-c* and their interconnections via their respective coupling ports (A and B), as discussed above. As shown in FIG. 3, the three coupled analog circuits 120*a-c* include, respectively, AC input 205*a*, AC input 205*b*, and AC input 205*c*. As explained above, in an actual implementation, these controlled AC sources 205*a-c* are replaced with outputs 115*a-c*, respectively, from the microphones 110*a-c* that receive the acoustic wave 105. As also shown in FIG. 3, analog circuits 120*a-c* include operational amplifiers 210, resistors 215, and capacitors 220. As discussed above in connection with FIG. 1, analog circuit 120*a* outputs voltage signal 135*a*, analog circuit 120*b* outputs voltage signal 135*b*, and analog circuit 120*c* outputs voltage signal 135*c*.

As discussed above, incident-angle determination system 100 models a set of N virtual coupled acoustic resonators (e.g., virtual coupled Helmholtz resonators) using a set of N coupled differential equations, and each transducer (e.g., microphone 110) in incident-angle determination system 100 is modeled as being within (partially enclosed by) one of the N virtual coupled acoustic resonators. The set of N virtual coupled acoustic resonators for the case of N equal to 3 is illustrated in FIG. 4.

Figure 4:
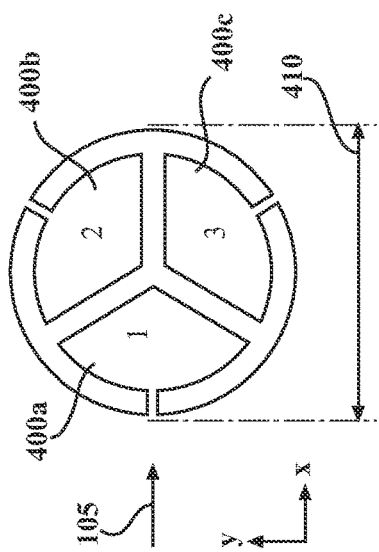
FIG. 4 is a diagram of a set of three virtual coupled Helmholtz resonators, in accordance with an illustrative embodiment of the invention.

FIG. 4 is a diagram of a set of three virtual coupled Helmholtz resonators, in accordance with an illustrative embodiment of the invention. As shown in the top view of FIG. 4, the set of three virtual coupled Helmholtz resonators includes virtual Helmholtz resonator 400*a*, virtual Helmholtz resonator 400*b*, and virtual Helmholtz resonator 400*c*. Transducers (e.g., microphones 110*a-c*) are mathematically modeled as being located within the virtual coupled Helmholtz resonators 400 at approximately the respective positions indicated by the numbers "1," "2," and "3" in FIG. 4. In one embodiment, the frequency of the acoustic wave 105 (see FIG. 1) is 1750 Hz, though many other acoustic frequencies could be encountered, in practice. This frequency is merely one example for the sake of illustration. In one embodiment, diameter 410 of the set of virtual coupled Helmholtz resonators 400 is 20 mm. The differential equations and other mathematical concepts discussed below model the set of three virtual coupled Helmholtz resonators 400 in FIG. 4. As discussed above, the three coupled analog circuits 120*a-c* shown in FIG. 3 solve a set of three coupled differential equations. These concepts generalize to other values of N. That is, an incident-angle determination system designed for N transducers (where N is greater than or equal to 2) includes N coupled analog circuits 120 and N virtual coupled acoustic resonators 400 modeled by a set of N coupled differential equations.

Referring once again to FIGS. 3 and 4, in this embodiment, the three coupled differential equations can be expressed in matrix form as follows:

$$\frac{d^2}{dt^2}\begin{bmatrix} m & 0 & 0 \\ 0 & m & 0 \\ 0 & 0 & m \end{bmatrix}\begin{bmatrix} x_1 \\ x_2 \\ x_3 \end{bmatrix} + \frac{d}{dt}\begin{bmatrix} \gamma+\delta & \gamma_{c,12} & \gamma_{c,13} \\ \gamma_{c,21} & \gamma+\delta & \gamma_{c,23} \\ \gamma_{c,31} & \gamma_{c,32} & \gamma+\delta \end{bmatrix}\begin{bmatrix} x_1 \\ x_2 \\ x_3 \end{bmatrix} + \begin{bmatrix} k & 0 & 0 \\ 0 & k & 0 \\ 0 & 0 & k \end{bmatrix}\begin{bmatrix} x_1 \\ x_2 \\ x_3 \end{bmatrix} = \begin{bmatrix} f_1 \\ f_2 \\ f_3 \end{bmatrix},$$

where $f_1$, $f_2$, $f_3$ are the forces exerted on the three transducers, microphone 110*a*, microphone 110*b*, and microphone 110*c*, respectively, by the incoming acoustic wave 105; m (components in a matrix M) is the mass of each virtual Helmholtz resonator 400; $x_1$, $x_2$, and $x_3$ are the respective amplitudes of vibration of the virtual Helmholtz resonators 400*a-c*; k (components in a matrix K) is a stiffness parameter for the material from which the virtual coupled Helmholtz resonators 400*a-c* are made; and a matrix C above contains parameters such as $\gamma$ and $\delta$ relating to intrinsic loss rates (on the diagonal) and coupling losses (off-diagonal). More specifically, $\gamma$ is the leakage, and $\delta$ is the intrinsic (damping) loss inside a given virtual Helmholtz resonator 400.

The above set of three coupled differential equations can also be written as follows:

$$\begin{cases} m\ddot{x}_1 + (\gamma+\delta)\dot{x}_1 + \gamma_{c,12}\dot{x}_2 + \gamma_{c,13}\dot{x}_3 + kx_1 = f_1 \\ m\ddot{x}_2 + \gamma_{c,21}\dot{x}_1 + (\gamma+\delta)\dot{x}_2 + \gamma_{c,23}\dot{x}_3 + kx_2 = f_2 \\ m\ddot{x}_3 + \gamma_{c,31}\dot{x}_1 + \gamma_{c,32}\dot{x}_2 + (\gamma+\delta)\dot{x}_3 + kx_3 = f_3 \end{cases}$$

The coupling term in the above differential equations involves imaginary parts of complex numbers that are not modeled by the coupled analog circuits 120. However, this effect is equivalent to additional mass with real coupling terms, as expressed in the following matrix-form equation:

$$(-\omega^2 M \times \alpha - i\omega \mathfrak{R}(C) + K)x = f,$$

where $\omega$ is the angular frequency of the acoustic wave 105, M is the mass matrix discussed above, $\alpha$ is a scale factor that accounts for the additional mass, i is the imaginary unit, and $\mathfrak{R}(C)$ is the real part of the matrix C discussed above. In one embodiment the scale factor $\alpha$ is 2.734977.

The above set of three coupled differential equations can also be written in terms of the component values in the circuit schematic shown in FIG. 3:

$$\begin{cases} \ddot{x}_1 + (CR_1)^{-1}\dot{x}_1 + (CR_{c,12})^{-1}\dot{x}_2 + (CR_{c,13})^{-1}\dot{x}_3 + (RR_2 C^2)^{-1}x_1 = \\ \qquad (R^2 C^2)^{-1}f_1 \\ \ddot{x}_2 + (CR_{c,21})^{-1}\dot{x}_1 + (CR_1)^{-1}\dot{x}_2 + (CR_{c,23})^{-1}\dot{x}_3 + (RR_2 C^2)^{-1}x_2 = \\ \qquad (R^2 C^2)^{-1}f_2 \\ \ddot{x}_3 + (CR_{c,31})^{-1}\dot{x}_1 + (CR_{c,32})^{-1}\dot{x}_2 + (CR_1)^{-1}\dot{x}_3 + (RR_2 C^2)^{-1}x_3 = \\ \qquad (R^2 C^2)^{-1}f_3 \end{cases}$$

Figure 5A:
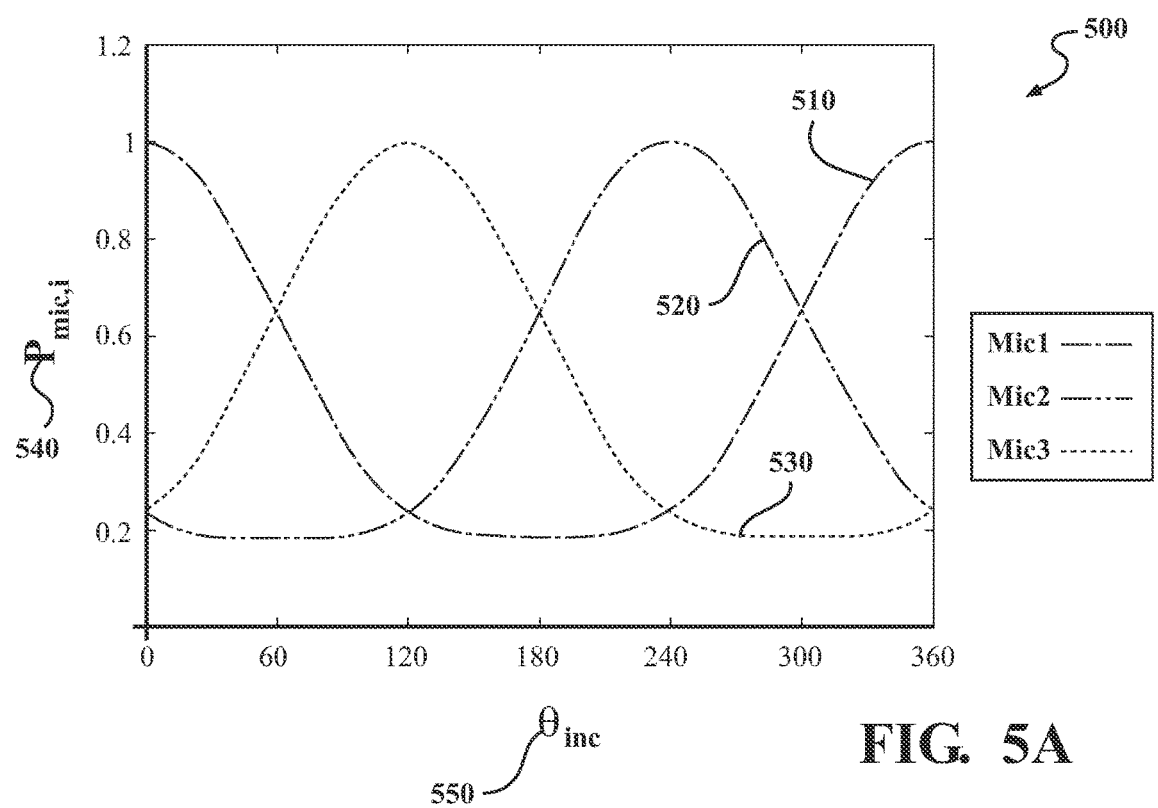
FIG. 5A is a graph of theoretical microphone output power with complex coupling as a function of incident angle for three microphones, in accordance with an illustrative embodiment of the invention.
Figure 5B:
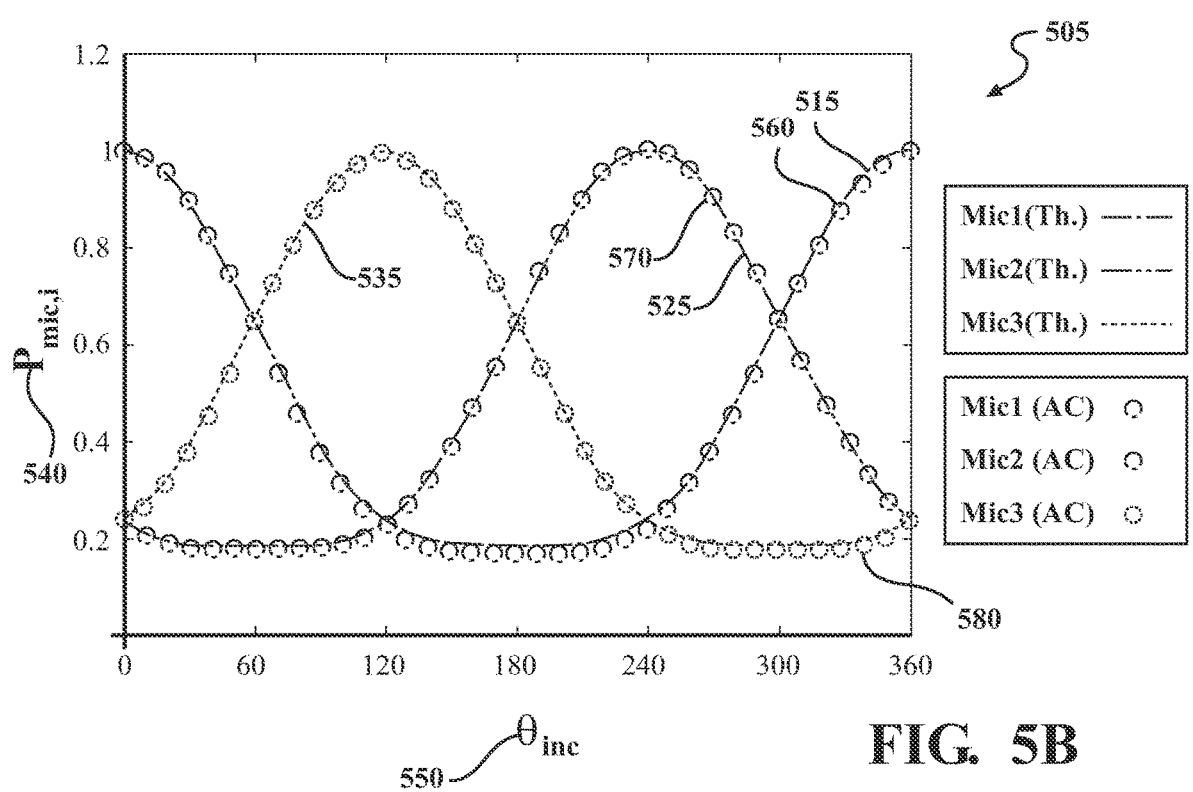
FIG. 5B is a graph comparing theoretical and simulated output power with real-valued coupling as a function of incident angle for three microphones, in accordance with an illustrative embodiment of the invention.

Those skilled in the art will recognize that the component values (resistors and capacitors) can be solved for by comparing the differential equations immediately above with the earlier set above that is expressed in terms of the parameters m, $\gamma$, $\delta$, k, etc. Those physical parameters are determined by the particular set of coupled Helmholtz resonators to be modeled. FIGS. 5A and 5B demonstrate the similarity between complex coupling and real coupling with added mass.

FIG. 5A is a graph 500 of theoretical microphone output power (540) with complex coupling as a function of incident angle 550 for three microphones, in accordance with an illustrative embodiment of the invention. Graph 500 plots theoretical power from Microphone 1 (510), theoretical power from Microphone 2 (520), and theoretical power from Microphone 3 (530) as a function of incident angle 550. As discussed above, with N equal to 3, incident-angle determination system 100 can determine incident angles 550 within a range of 0 to 360°, inclusive.

FIG. 5B is a graph 505 comparing theoretical and simulated output power (540) with real-valued coupling as a function of incident angle 550 for three microphones, in accordance with an illustrative embodiment of the invention. Graph 505 plots three solid curves representing theoretical power from Microphone 1 (515), theoretical power from Microphone 2 (525), and theoretical power from Microphone 3 (535). Graph 505 also plots simulated points 560 for Microphone 1, simulated points 570 for Microphone 2, and simulated points 580 for Microphone 3.

As discussed above (refer to FIG. 1), the plurality of program instructions 155, when executed by the one or more processors (or whatever hardware device implements the functionality of controller 140), cause the one or more processors to output an estimated incident angle 145 of the acoustic wave 105 based on an analysis of the N voltage signals 135 output by the N coupled analog circuits 120. In one embodiment, this analysis includes computing a corresponding power level 540 for each of the N voltage signals 135 and computing a power ratio between at least one pair of power levels among the N corresponding power levels. This technique is illustrated and explained in greater detail below in connection with FIG. 6.

Figure 6:
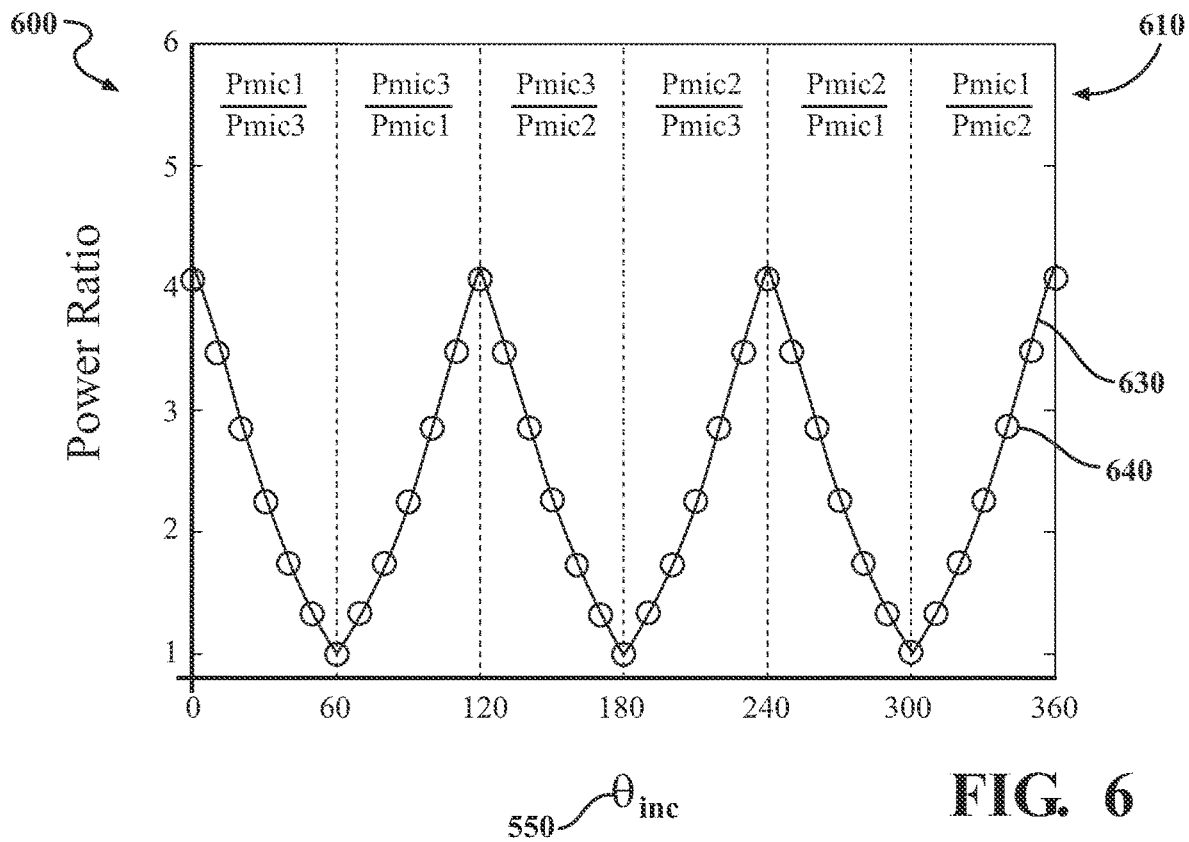
FIG. 6 is a graph illustrating how the incident angle of an acoustic wave can be estimated based on computed power ratios between pairs of microphones, in accordance with an illustrative embodiment of the invention.

FIG. 6 is a graph 600 illustrating how the incident angle 550 of an acoustic wave 105 can be estimated based on computed power ratios 610 between pairs of microphones, in accordance with an illustrative embodiment of the invention. FIG. 6 relates to the embodiment discussed above in connection with FIGS. 3 and 4. In FIG. 6, the full incident-angle 550 range of 360° is divided into six divisions (i.e., every 60°). A power ratio is calculated for each division between the two microphones 110 having the highest output signals 115 (e.g., the ratio of the power from Microphone 1 to the power from Microphone 3 or $P_{mic1}/P_{mic3}$, for the first division). The solid curve (630) in FIG. 6 represents the theoretically calculated acoustic power ratios for the six sections using complex-valued coupling. The open circles (640) are simulated acoustic power-ratio values computed using real-valued coupling based on the three coupled analog circuits 120a-c in FIG. 3.

In this embodiment (N=3), the program instructions 155 cause controller 140 (e.g., implemented as one or more processors coupled with a memory 150) to compute the six power ratios 610 shown in FIG. 6 and to ascertain the estimated incident angle 145 by comparing the respective power ratios 610 with the characteristic relationship between the six incident-angle ranges and the six power ratios 610 shown in FIG. 6.

As discussed above, in some embodiments, an incident-angle determination system is designed for N equal to 2. Such a design includes two coupled analog circuits 120 to solve a set of two coupled differential equations that model a set of two virtual coupled acoustic resonators 400 (e.g., two virtual coupled acoustic Helmholtz resonators). Each of the two transducers (e.g., microphones 110) that receive an acoustic wave 105 are modeled as being within a respective one of the two virtual coupled acoustic resonators 400. In a system in which N is equal to 2, the estimated incident angle 145 output by the incident-angle determination system is between 0 and 180°, inclusive. One advantage of a system designed with N equal to 3 is that the full incident-angle range of 360° can be covered. As also discussed above, in some embodiments N is greater than three, and the design of an incident-angle determination system is adjusted accordingly.

Figure 7:
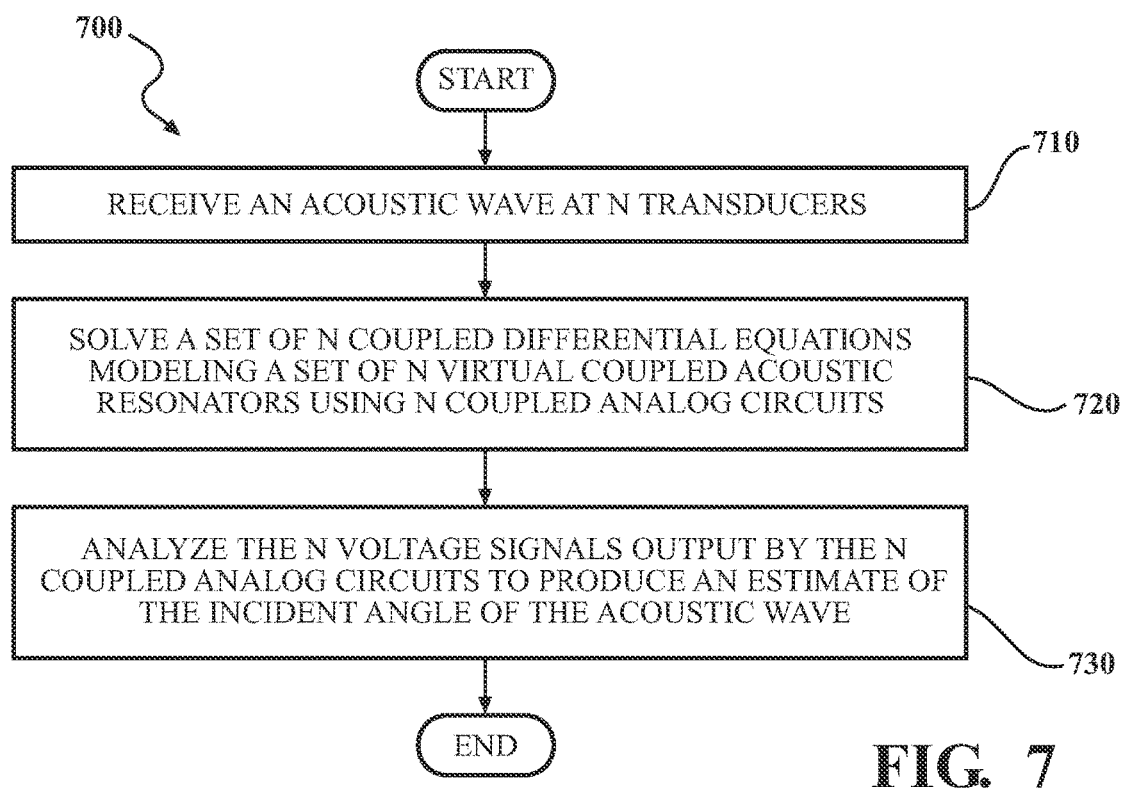
FIG. 7 is a flowchart of a method of determining an incident angle of an acoustic wave, in accordance with an illustrative embodiment of the invention.

FIG. 7 is a flowchart of a method 700 of determining an incident angle of an acoustic wave 105, in accordance with an illustrative embodiment of the invention. Method 700 will be discussed generally from the perspective of an incident-angle determination system in which N is greater than or equal to 2. An embodiment for N equal to 3 (incident-angle determination system 100) is discussed in detail above in connection with FIGS. 1-6. While method 700 applies to incident-angle determination system 100, it should be appreciated that method 700 is not limited to being implemented within incident-angle determination system 100, but incident-angle determination system 100 is instead one example of a system that may implement method 700.

At block 710, N transducers (e.g., microphones) receive an acoustic wave 105, where N is a natural number greater than or equal to 2. As discussed above, in some embodiments, a different type of transducers other than microphones can be used.

At block 720, a set of N coupled differential equations modeling a set of N virtual coupled acoustic resonators 400 (e.g., N virtual coupled Helmholtz resonators) is solved using N coupled analog circuits 120. As discussed above, each of the N coupled analog circuits 120 receives an output signal 115 from a unique one of the N transducers 110 and outputs a voltage signal 135. The differential equations, virtual coupled acoustic resonators 400, and coupled analog circuits 120 are discussed in greater detail above in connection with FIGS. 1-6. For example, as shown in FIG. 3, in some embodiments the N coupled analog circuits 120 are implemented using operational amplifiers 210, resistors 215, and capacitors 220. Also, as shown in FIGS. 1-3, each of the N coupled analog circuits includes a first coupling port (Coupling A port) 125 and a second coupling port (Coupling B port) 130. The first coupling port 125 of each of the N coupled analog circuits 120 is electrically connected with the first coupling port 125 and the second coupling port 130 of each of the other N−1 coupled analog circuits 120.

At block 730, the N voltage signals 135 output by the N coupled analog circuits 120 are analyzed to produce an estimated incident angle 145 of the acoustic wave 105. As discussed above, in one embodiment, a plurality of program instructions 155 residing in a memory 150, when executed by one or more processors, cause the one or more processors to perform the analysis and output the estimated incident angle 145. As also discussed above, in one embodiment, the analysis includes computing a corresponding power level 540 for each of the N voltage signals 135 and computing a power ratio 610 between at least one pair of power levels among the N corresponding power levels. A more specific example for the case of N equal to 3 is discussed above in connection with FIG. 6. In that embodiment, the program instructions 155 cause the one of more processors to compute the six power ratios 610 shown in FIG. 6 and to ascertain the estimated incident angle 145 by comparing the respective power ratios 610 with the known characteristic relationship between the six incident-angle ranges and the six power ratios 610 shown in FIG. 6.

As discussed above, in an embodiment in which N is equal to 3, the estimated incident angle 145 lies between 0 and 360°, inclusive. In an embodiment in which N is equal to 2, the estimated incident angle 145 lies between 0 and 180°, inclusive. Embodiments in which N is greater than 3 are also possible, as discussed above.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more embodiments" or "an embodiment" means that a particular feature, structure or characteristic described in connection with the embodiment is included in at least one or more embodiments (implementations). Thus, the appearances of the phrases "in one or more embodiments" or "in an embodiment" in various places throughout this specification are not necessarily all referring to the same embodiment. Furthermore, the particular features, structures, or characteristics may be combined in any suitable manner in one or more embodiments or implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for determining an incident angle of an acoustic wave, the system comprising:
    N transducers that receive the acoustic wave, wherein N is a natural number greater than or equal to 2;
    N coupled analog circuits that solve a set of N coupled differential equations modeling a set of N virtual coupled acoustic resonators, wherein each of the N coupled analog circuits receives an output signal from a unique one of the N transducers and outputs a voltage signal;
    one or more processors; and
    a memory communicably coupled to the one or more processors and storing a plurality of program instructions that when executed by the one or more processors cause the one or more processors to output an estimate of the incident angle of the acoustic wave based on an analysis of the N voltage signals output by the N coupled analog circuits.

2. The system of claim 1, wherein the N transducers are microphones.

3. The system of claim 1, wherein the set of N virtual coupled acoustic resonators is a set of N virtual coupled Helmholtz resonators.

4. The system of claim 1, wherein N is equal to 3 and the estimate of the incident angle of the acoustic wave is between 0 and 360 degrees, inclusive.

5. The system of claim 1, wherein N is equal to 2 and the estimate of the incident angle of the acoustic wave is between 0 and 180 degrees, inclusive.

6. The system of claim 1, wherein the analysis of the N voltage signals output by the N coupled analog circuits includes:
    computing a corresponding power level for each of the N voltage signals; and
    computing a power ratio between at least one pair of power levels among the N corresponding power levels.

7. The system of claim 1, wherein:
    each of the N coupled analog circuits includes a first coupling port and a second coupling port; and
    the first coupling port of each of the N coupled analog circuits is electrically connected with the first coupling port and the second coupling port of each of the other N−1 coupled analog circuits.

8. A non-transitory computer-readable medium for determining an incident angle of an acoustic wave and storing instructions that when executed by one or more processors cause the one or more processors to analyze N voltage signals output by N coupled analog circuits that solve a set of N coupled differential equations modeling a set of N virtual coupled acoustic resonators to produce an estimate of the incident angle of the acoustic wave, wherein:
    N is a natural number greater than or equal to 2;
    each of the N coupled analog circuits receives an output signal from a unique one of N transducers that receive the acoustic wave; and
    each of the N coupled analog circuits outputs one of the N voltage signals.

9. The non-transitory computer-readable medium of claim 8, wherein the N transducers are microphones.

10. The non-transitory computer-readable medium of claim 8, wherein the set of N virtual coupled acoustic resonators is a set of N virtual coupled Helmholtz resonators.

11. The non-transitory computer-readable medium of claim 8, wherein N is equal to 3 and the estimate of the incident angle of the acoustic wave is between 0 and 360 degrees, inclusive.

12. The non-transitory computer-readable medium of claim 8, wherein N is equal to 2 and the estimate of the incident angle of the acoustic wave is between 0 and 180 degrees, inclusive.

13. The non-transitory computer-readable medium of claim 8, wherein the instructions to analyze the N voltage signals output by the N coupled analog circuits that solve the set of N coupled differential equations modeling the set of N virtual coupled acoustic resonators to produce the estimate of the incident angle of the acoustic wave include instructions to:
    compute a corresponding power level for each of the N voltage signals; and
    compute a power ratio between at least one pair of power levels among the N corresponding power levels.

14. The non-transitory computer-readable medium of claim 8, wherein:
   each of the N coupled analog circuits includes a first coupling port and a second coupling port; and
   the first coupling port of each of the N coupled analog circuits is electrically connected with the first coupling port and the second coupling port of each of the other N−1 coupled analog circuits.

15. A method of determining an incident angle of an acoustic wave, the method comprising:
   receiving an acoustic wave at N transducers, wherein N is a natural number greater than or equal to 2;
   solving a set of N coupled differential equations modeling a set of N virtual coupled acoustic resonators using N coupled analog circuits, wherein each of the N coupled analog circuits receives an output signal from a unique one of the N transducers and outputs a voltage signal; and
   analyzing the N voltage signals output by the N coupled analog circuits to produce an estimate of the incident angle of the acoustic wave.

16. The method of claim 15, wherein the N transducers are microphones.

17. The method of claim 15, wherein the set of N virtual coupled acoustic resonators is a set of N virtual coupled Helmholtz resonators.

18. The method of claim 15, wherein N is equal to 3 and the estimate of the incident angle of the acoustic wave is between 0 and 360 degrees, inclusive.

19. The method of claim 15, wherein N is equal to 2 and the estimate of the incident angle of the acoustic wave is between 0 and 180 degrees, inclusive.

20. The method of claim 15, wherein the analyzing the N voltage signals output by the N coupled analog circuits to produce the estimate of the incident angle of the acoustic wave includes:
   computing a corresponding power level for each of the N voltage signals; and
   computing a power ratio between at least one pair of power levels among the N corresponding power levels.

\* \* \* \* \*